Nov. 16, 1965  A. HIRTZ  3,217,396
METHOD OF MOUNTING A THRUST PLATE ASSEMBLY AND THE LIKE
Filed Aug. 10, 1962
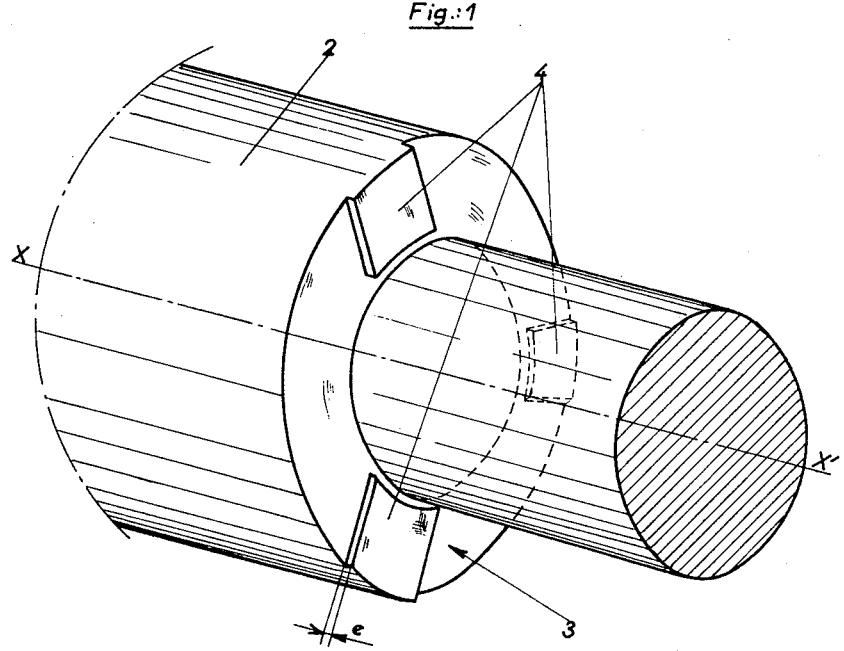
*Fig.:1*
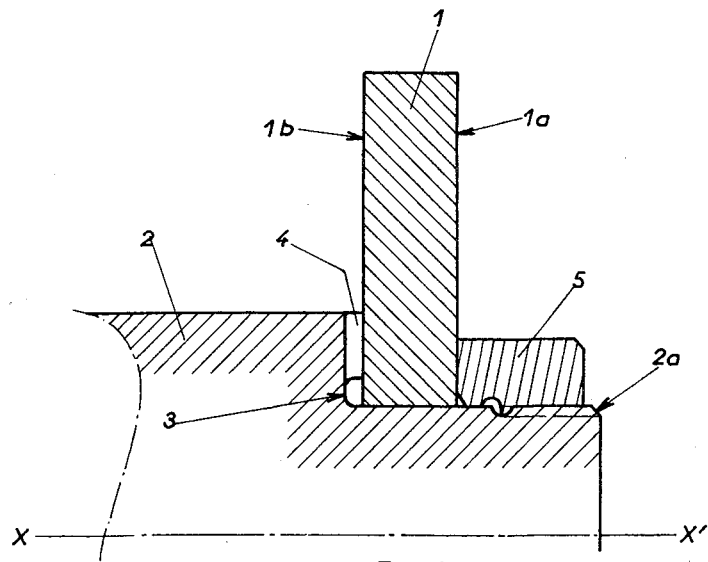
*Fig.:2*

United States Patent Office 3,217,396
Patented Nov. 16, 1965

3,217,396
METHOD OF MOUNTING A THRUST PLATE ASSEMBLY AND THE LIKE
Alfred Hirtz, Boulogne-sur-Seine, France, assignor to Société Anonyme dite: Societe Rateau, Paris, France, a company of France
Filed Aug. 10, 1962, Ser. No. 216,242
Claims priority, application France, Sept. 5, 1961, 872,374
2 Claims. (Cl. 29—407)

The invention relates to the assembling or mounting of mechanical parts such as the mounting of thrust plates on shafts. It concerns a new method of mounting with high precision a part having a plane surface, perpendicularly to an axis, or to a predetermined angle to the axis.

In mechanical construction, it is often necessary to mount or assemble a part having a plane surface, for example a thrust disc, so that this surface, for example a face of the disc, will be exactly perpendicular to a shaft or will make very exactly a predetermined angle with the shaft. To effect such assembly, generally two associated surfaces are applied to one another, one belonging to the part carrying the plane surface and the other to the part integral with the shaft. The fitting of the parts to be assembled presents considerable difficulties, because the precision of assemblage is determined by the state of the associated surfaces and by the exactness of their geometrical arrangement.

According to the invention, extremely precise assembly is obtained by supporting a face of the part, which has to have a plane surface perpendicular to a shaft or make a predetermined angle with the shaft, on three points or three supports of very small surface provided on a part integral with the shaft.

The following description with reference to the accompanying drawings, given by way of non-restrictive example, will make the various features of the invention and the method of realising them well understood, any arrangement resulting both from the text and the figures naturally coming within the scope of the present invention.

FIGURE 1 shows in perspective a shaft end prepared to receive a thrust plate, and FIGURE 2 is an axial half-section showing the plate mounted on the shaft.

The thrust plate 1 has to be mounted so that the surface 1a will be very exactly perpendicular to the axis XX' of the shaft 2. The surface 1a of the disc having been trued with the required precision for it to be perfectly plane, there is cut in the end of the shaft 2 a shoulder 3 provided with three supports 4 of small surface, arranged at 120° and having a thickness e sufficient to permit subsequent truing.

The face 1b of the disc may be rough-machined, that is to say, the state of its surface and its parallelism with the trued face 1a may be those normally obtained by machining on a machine tool. The three supports 4 of small surface are then adjusted by truing and checking to the required precision, which is independent of the state of the face 1b and of its parallelism with the surface 1a, for this surface 1a to be very exactly perpendicular to the axis XX'.

Truing and adjustment having been completed, the plate 1 is fixed to the shaft 2 by means of a nut 5 screwed on the screw-thread 2a of said shaft in accordance with a known arrangement.

The surface of the supports 4 should be so calculated of course that these supports will support without permanent deformation or with predetermined elastic deformation, the thrusts transmitted from the shaft 2 to the plate 1.

It is evident that the embodiments described are only examples and that they could be modified, particularly by substitution of technical equivalents, without for that purpose departing from the scope of the invention. In particular, the three supports 4 could be also trued so that the surface 1a will make very exactly a predetermined angle with the axis XX'.

I claim:

1. A method of so assembling a thrust plate with a shaft that a plane surface of the thrust plate is very exactly perpendicular to the axis of the shaft, comprising: cutting an end portion of the shaft to form a reduced end portion and a shoulder having three angularly spaced and axially projecting supports, providing the thrust plate with a central bore in register with the said reduced end and a mounting surface substantially parallel to the said plane surface, truing and checking the three supports until the said plane surface has the required orientation when the mounting surface is mounted on the three supports, and fixedly biasing said thrust plate to hold the said mounting surface on the supports.

2. A method of so assembling a first machine part having a plane surface with a second machine part having an axis that the plane surface of the first part has a predetermined orientation relative to the axis of the second part, comprising the steps of forming said second part with means for locating said first part relative to said axis and with three axially projecting supports integral with said second part and angularly spaced around said axis, providing said first part with means cooperative with said locating means to locate said second part relative to said axis and with a mounting surface for mounting on said three supports, and checking and truing the three supports by removal of material therefrom until the said plane surface has the required orientation when the mounting is mounted on the three supports, and assembling and securing said parts together with said mounting surface on said supports.

References Cited by the Examiner
UNITED STATES PATENTS

| 1,826,503 | 10/1931 | Buckwalter | 29—407 |
| 2,730,387 | 1/1956 | White | 287—53 |
| 2,851,292 | 9/1958 | McClain | 287—53 |
| 2,885,773 | 5/1959 | Molinaro | 29—407 |

References Cited by the Applicant
UNITED STATES PATENTS

| 1,151,549 | 8/1915 | Schade. |
| 2,322,615 | 6/1943 | Boucher. |
| 2,775,423 | 12/1956 | Strass. |

WHITMORE A. WILTZ, *Primary Examiner.*
CARL W. TOMLIN, *Examiner.*